US011924538B2

(12) United States Patent
Lei

(10) Patent No.: US 11,924,538 B2
(45) Date of Patent: Mar. 5, 2024

(54) TARGET TRACKING METHOD AND APPARATUS AND UNMANNED AERIAL VEHICLE

(71) Applicant: AUTEL ROBOTICS CO., LTD., Guangdong (CN)

(72) Inventor: Xiaogang Lei, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 188 days.

(21) Appl. No.: 17/310,717

(22) PCT Filed: Feb. 26, 2020

(86) PCT No.: PCT/CN2020/076796
§ 371 (c)(1),
(2) Date: Aug. 19, 2021

(87) PCT Pub. No.: WO2020/173463
PCT Pub. Date: Sep. 3, 2020

(65) Prior Publication Data
US 2022/0191389 A1    Jun. 16, 2022

(30) Foreign Application Priority Data
Feb. 28, 2019   (CN) .......................... 201910149496.1

(51) Int. Cl.
*H04N 23/61*       (2023.01)
*B64C 39/02*       (2023.01)
(Continued)

(52) U.S. Cl.
CPC ........... *H04N 23/61* (2023.01); *B64C 39/024* (2013.01); *B64D 47/08* (2013.01); *H04N 7/181* (2013.01);
(Continued)

(58) Field of Classification Search
CPC ........ H04N 23/61; H04N 23/66; H04N 7/181; B64C 39/024; B64D 47/08; B64U 2101/30
(Continued)

(56) References Cited

U.S. PATENT DOCUMENTS

2003/0012425 A1*  1/2003  Suzuki ............... G02B 27/0093
                                                    348/E13.05
2005/0128291 A1*  6/2005  Murakami ............. H04N 7/181
                                                    348/169
(Continued)

FOREIGN PATENT DOCUMENTS

CN          106504363 A       3/2017
CN          106683123 A       5/2017
(Continued)

OTHER PUBLICATIONS

International Search Report dated Jun. 2, 2020; PCT/CN2020/076796 with English translation.

*Primary Examiner* — Matthew David Kim

(57) ABSTRACT

The embodiment is a target tracking method. The method is applicable to a UAV including a visible light camera and an infrared camera, and includes: controlling the visible light camera to perform visual tracking on a target object, and recording first tracking information of the target object in real time; controlling the infrared camera to perform infrared tracking on the target object, and recording second tracking information of the target object in real time; controlling, in a case of determining that the target object is lost in the visible light camera, the visible light camera to re-lock the target object according to the second tracking information and continue to perform visual tracking; or controlling, in a case of determining that the target object is lost in the infrared camera, the infrared camera to re-lock the target
(Continued)

object according to the first tracking information and continue to perform infrared tracking.

14 Claims, 4 Drawing Sheets

(51) Int. Cl.
  *B64D 47/08* (2006.01)
  *H04N 7/18* (2006.01)
  *H04N 23/66* (2023.01)
  *B64U 101/30* (2023.01)

(52) U.S. Cl.
  CPC ......... *H04N 23/66* (2023.01); *B64U 2101/30* (2023.01)

(58) Field of Classification Search
  USPC ........................................... 348/144
  See application file for complete search history.

(56) References Cited

U.S. PATENT DOCUMENTS

| | | | |
|---|---|---|---|
| 2010/0017046 A1* | 1/2010 | Cheung | G05D 1/0094 701/2 |
| 2010/0328455 A1* | 12/2010 | Nam | G06T 7/285 348/135 |
| 2012/0147191 A1* | 6/2012 | Snoussi | G08B 13/19608 382/103 |
| 2014/0049643 A1* | 2/2014 | Segerstrom | F21V 21/30 250/234 |
| 2014/0226024 A1* | 8/2014 | Limbaugh | H04N 23/62 348/169 |
| 2015/0324656 A1* | 11/2015 | Marks | G06V 40/10 383/103 |
| 2018/0068164 A1* | 3/2018 | Cantrell | B64C 39/024 |
| 2018/0135723 A1* | 5/2018 | Tian | G03B 15/006 |
| 2018/0164820 A1 | 6/2018 | Aboutalib et al. | |
| 2018/0224527 A1* | 8/2018 | Lüthi | G01C 15/006 |
| 2019/0392211 A1* | 12/2019 | Hartman | G06V 20/20 |
| 2020/0143545 A1* | 5/2020 | Weng | G06T 5/50 |
| 2020/0159222 A1* | 5/2020 | Mao | G06T 7/593 |
| 2021/0208673 A1* | 7/2021 | Forster | G06V 40/107 |

FOREIGN PATENT DOCUMENTS

| | | |
|---|---|---|
| CN | 107255468 A | 10/2017 |
| CN | 108364003 A | 8/2018 |
| CN | 109218598 A | 1/2019 |
| CN | 109828596 A | 5/2019 |

\* cited by examiner

TARGET TRACKING METHOD AND APPARATUS AND UNMANNED AERIAL VEHICLE

CROSS-REFERENCE TO RELATED APPLICATIONS

This application is a continuation of International Application No. PCT/CN2020/076796, filed on Feb. 26, 2020, which claims priority to Chinese Patent Application No. 2019101494961 filed on Feb. 28, 2019, which is incorporated herein by reference in its entirety.

TECHNICAL FIELD

The present application relates to the field of unmanned aerial vehicle technologies, and in particular, to a target tracking method and apparatus and an unmanned aerial vehicle.

BACKGROUND

Unmanned aerial vehicle (UAV) is an unmanned aircraft that uses a radio remote control device and built-in programs to control a flight posture. With the advantages of flexible maneuverability, quick response, unmanned driving and low operation requirements, the UAV has been widely applied to many fields such as aerial photography, plant protection, power inspection, disaster relief and the like.

Currently, a given target object may be recognized and tracked by using the UAV. However, in an existing target tracking method, the UAV usually uses a visible light camera mounted on the UAV to perform visual tracking on a target object. When the target object has rare features, a small size, or is shielded, the target object is easily lost, which leads to a failure in tracking.

Therefore, the existing target tacking method still needs to be improved and developed.

SUMMARY

Embodiments of the present invention provide a target tracking method and apparatus and a UAV, which is intended to resolve a problem that when a target object has rare features, a small size, or is blocked, the target object is easily lost, which leads to a failure in tracking.

To resolve the foregoing technical problem, the embodiments of the present invention provide the following technical solutions:

According to a first aspect, an embodiment of the present invention provides a target tracking method, applicable to a UAV, the UAV including a visible light camera and an infrared camera. The method includes:
  controlling the visible light camera to perform visual tracking on a target object, and recording first tracking information of the target object in real time, where the first tracking information includes first location information of the target object;
  controlling the infrared camera to perform infrared tracking on the target object, and recording second tracking information of the target object in real time, where the second tracking information includes second location information of the target object;
  in a case of determining that the target object is lost in the visible light camera,
    controlling the visible light camera to re-lock the target object according to the second tracking information and continue to perform visual tracking; or
  in a case of determining that the target object is lost in the infrared camera,
    controlling the infrared camera to re-lock the target object according to the first tracking information and continue to perform infrared tracking.

Optionally, the controlling the visible light camera to perform visual tracking on a target object, and recording first tracking information of the target object in real time includes:
  controlling the visible light camera to acquire an initial visible light image including the target object;
  determining an image feature and an initial location of the target object based on the initial visible light image; and
  controlling the visible light camera to perform visual tracking on the target object based on the image feature, and recording the first tracking information of the target object in real time.

Optionally, the controlling the infrared camera to perform infrared tracking on the target object, and recording second tracking information of the target object in real time includes:
  controlling the infrared camera to acquire an initial infrared image of the target object;
  extracting a heat signature of the target object from the initial infrared image according to the initial location of the target object; and
  controlling the infrared camera to perform infrared tracking on the target object based on the heat signature, and recording the second tracking information of the target object in real time.

Optionally, the method further includes:
  determining, when the first location information is inconsistent with the second location information, whether the visible light camera and the infrared camera are interfered;
  controlling, if the visible light camera is not interfered, the infrared camera to re-lock the target object according to the first location information and continue to perform infrared tracking;
  controlling, if the visible light camera is interfered, but the infrared camera is not interfered, the visible light camera to re-lock the target object according to the second location information and continue to perform visual tracking; and
  transmitting a manual control request to a remote control device of the UAV if both the visible light camera and the infrared camera are interfered, to exit an automatic tracking mode.

Optionally, the method further includes:
  transmitting a visible light image acquired by the visible light camera to the remote control device of the UAV, so that the remote control device displays the visible light image in real time.

Optionally, when the target object is lost in the visible light camera, the method further includes:
  transmitting an infrared image acquired by the infrared camera to the remote control device, so that the remote control device displays the infrared image or simultaneously displays the visible light image and the infrared image.

Optionally, the method further includes:
  receiving a target adjustment instruction transmitted by the remote control device;
  controlling the visible light camera to re-lock a new target object according to the target adjustment instruction and perform visual tracking, and recording third tracking information of the re-locked new target object in real time; and controlling the infrared camera to perform infrared tracking on the re-locked new target object according to the third tracking information, and recording fourth tracking information of the re-locked new target object in real time, where the third tracking information and the fourth tracking information are tracking information for the new target object that is re-locked according to the target adjustment instruction.

According to a second aspect, an embodiment of the present invention provides a target tracking apparatus, applicable to a UAV, the UAV including a visible light camera and an infrared camera. The apparatus includes:

a visual tracking unit, configured to control the visible light camera to perform visual tracking on a target object, and record first tracking information of the target object in real time, where the first tracking information includes first location information of the target object;

an infrared tracking unit, configured to control the infrared camera to perform infrared tracking on the target object, and record second tracking information of the target object in real time, where the second tracking information includes second location information of the target object;

a first adjustment unit, configured to control, in a case of determining that the target object is lost in the visible light camera, the visible light camera to re-lock the target object according to the second tracking information and continue to perform visual tracking; and a second adjustment unit, configured to control, in a case of determining that the target object is lost in the infrared camera, the infrared camera to re-lock the target object according to the first tracking information and continue to perform infrared tracking.

Optionally, the visual tracking unit is further configured to:

control the visible light camera to acquire an initial visible light image including the target object;

determine an image feature and an initial location of the target object based on the initial visible light image; and control the visible light camera to perform visual tracking on the target object based on the image feature, and record the first tracking information of the target object in real time.

Optionally, the infrared tracking unit is further configured to:

control the infrared camera to acquire an initial infrared image of the target object;

extract a heat signature of the target object from the initial infrared image according to the initial location of the target object; and control the infrared camera to perform infrared tracking on the target object based on the heat signature, and record the second tracking information of the target object in real time.

Optionally, the apparatus further includes a third adjustment unit, the third adjustment unit being configured to:

determine, when the first location information is inconsistent with the second location information, whether the visible light camera and the infrared camera are interfered;

control, if the visible light camera is not interfered, the infrared camera to re-lock the target object according to the first location information and continue to perform infrared tracking;

control, if the visible light camera is interfered, but the infrared camera is not interfered, the visible light camera to re-lock the target object according to the second location information and continue to perform visual tracking; and transmit a manual control request to a remote control device of the UAV if both the visible light camera and the infrared camera are interfered, to exit an automatic tracking mode.

Optionally, the apparatus further includes:

a first transmission unit, configured to transmit a visible light image acquired by the visible light camera to the remote control device of the UAV, so that the remote control device displays the visible light image in real time.

Optionally, the apparatus further includes:

a second transmission unit, configured to transmit, when the target object is lost in the visible light camera, an infrared image acquired by the infrared camera to the remote control device, so that the remote control device displays the infrared image or simultaneously displays the visible light image and the infrared image.

Optionally, the apparatus further includes a fourth adjustment unit, the fourth adjustment unit being configured to:

receive a target adjustment instruction transmitted by the remote control device;

control the visible light camera to re-lock a new target object according to the target adjustment instruction and perform visual tracking, and record third tracking information of the re-locked new target object in real time; and control the infrared camera to perform infrared tracking on the re-locked new target object according to the third tracking information, and record fourth tracking information of the re-locked new target object in real time, where the third tracking information and the fourth tracking information are tracking information for the new target object that is re-locked according to the target adjustment instruction.

According to a third aspect, an embodiment of the present invention provides a UAV, including:

a body;

arms connected to the body;

a visible light camera, disposed on the body;

an infrared camera, disposed on the body;

a processor, disposed on the body, where the processor is communicatively connected to the visible light camera and the infrared camera respectively; and a memory, communicatively connected to the processor, where the memory stores instructions executable by the at least one processor, the instructions being executed by the at least one processor, to cause the at least one processor to perform the target tracking method as described above.

According to a fourth aspect, an embodiment of the present invention further provides a non-transitory computer-readable storage medium, the non-transitory computer-readable storage medium storing computer-executable instructions, the computer-executable instructions being configured to enable a UAV to perform the target tracking method as described above.

According to the fifth aspect, an embodiment of the present invention further provides a computer program product, the computer program product including a computer program stored in a non-transitory computer-readable storage medium, the computer program including program instructions, the program instructions, when executed by a UAV, causing the UAV to perform the target tracking method as described above.

The embodiments of the present invention have the following beneficial effects: different from the prior art, according to the target tracking method and apparatus and the UAV provided in the embodiments of the present invention, a visible light camera and an infrared camera disposed on the UAV are controlled to respectively perform visual tracking and infrared tracking on a target object, and record first tracking information and second tracking information of the target object in real time. In addition, when the target object is lost in the visible light camera, the visible light camera is controlled to re-lock the target object according to the second tracking information recorded by the infrared camera and continue to perform visual tracking. Alternatively, when the target object is lost in the infrared camera, the infrared camera is controlled to re-lock the target object according to the first tracking information recorded by the visible light camera and continue to perform infrared tracking, which can improve the target tracking performance of the UAV and expand the scope of application by cooperating the two types of cameras.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following descriptions are merely some embodiments of the present invention, and a person of ordinary skill in the art may further obtain other accompanying drawings according to the accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments herein are provided for describing the present invention and not intended to limit the present invention.

It should be noted that if no conflict occurs, features in the embodiments or one embodiment of the present invention may be combined with each other and fall within the protection scope of the present invention. In addition, although functional module division is performed in the schematic diagram of the apparatus, and a logical sequence is shown in the flowchart, in some cases, the shown or described steps may be performed by using module division different from the module division in the schematic diagram of the apparatus, or in a sequence different from the sequence in the flowchart. Further, terms such as "first", "second", or the like used in the present invention do not limit data or an execution order, but are only used to distinguish the same objects or similar objects whose functions and purposes are basically the same.

Embodiment 1

Figure 1:
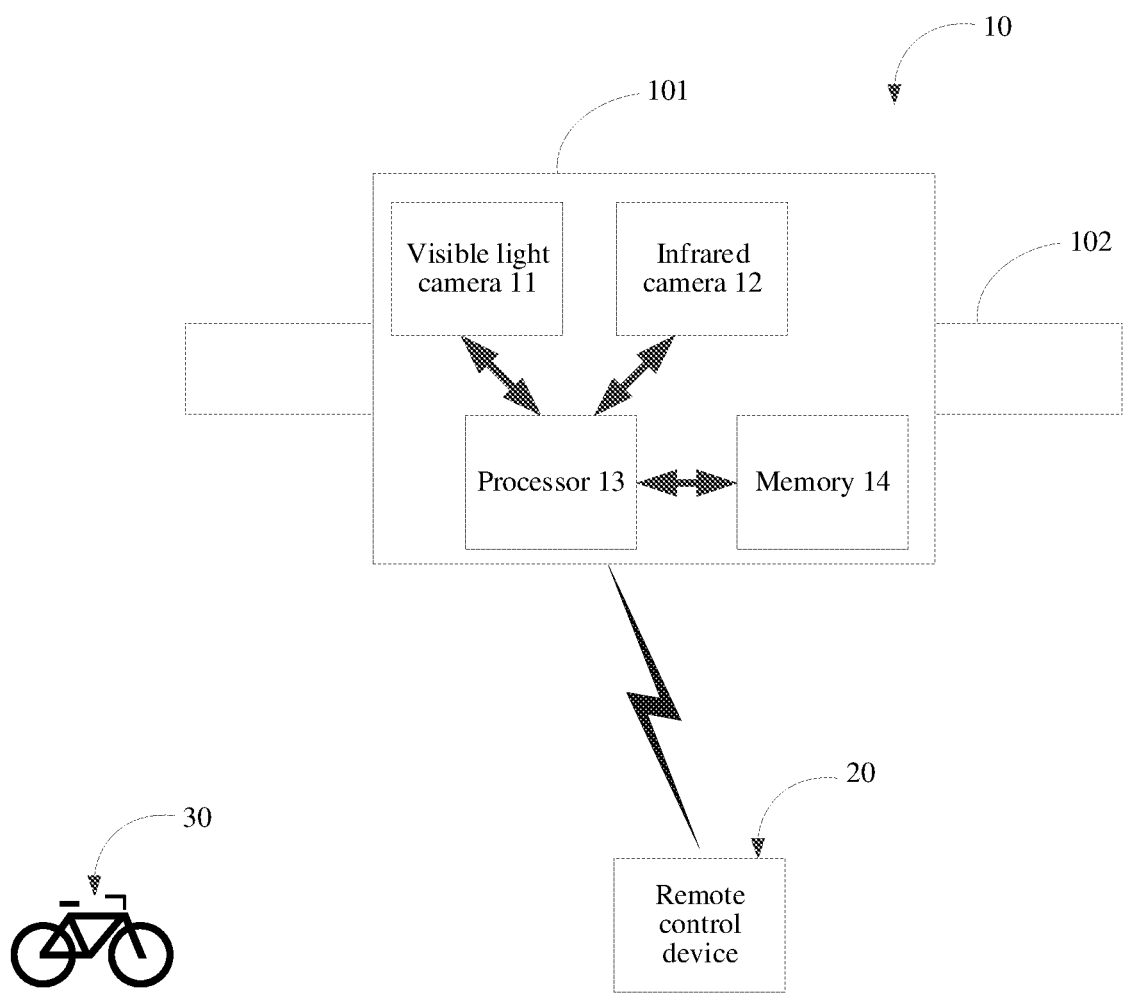
FIG. 1 is a schematic diagram of an application environment of a target tracking method according to an embodiment of the present invention.

FIG. 1 is a schematic diagram of an application environment of a target tracking method according to an embodiment of the present invention. Referring to FIG. 1, the application environment includes: a UAV 10, a remote control device 20 and a target object 30. The UAV 10 may be in wireless communication connection with the remote control device 20 in any manner. For example, wireless connection may be implemented by using wireless fidelity (Wi-Fi), a Bluetooth technology or a mobile communication technology such as the 3rd generation (3G), the 4th generation (4G) or the 5th generation (5G), which is not limited herein.

The UAV 10 may be an unmanned aircraft of any type, and may include, but is not limited to: a single-rotor UAV, a quadrotor UAV, and a hexarotor UAV, a tiltrotor UAV and the like.

Specifically, the UAV 10 includes a body 101 and arms 102 connected to the body 101. A visible light camera 11, an infrared camera 12, a processor 13 and a memory 14 are mounted on the body 101.

The visible light camera 11 refers to a device that forms an image by using a principle of optical imaging and records the image by using a negative. The visible light camera may be any optical device configured for photographing, and an image acquired by the visible light camera is a visible light image. The infrared camera 12 refers to a device that uses non-contact detected infrared energy (or referred to as heat) and converts the energy to an electrical signal, to form infrared image data. The infrared camera may be specifically an infrared tracker. Both the visible light camera 11 and the infrared camera 12 are communicatively connected to the processor 13, and can perform corresponding tasks based on instructions of the processor 13 and give corresponding feedback to the processor 13. For example, the tasks are image acquisition, target tracking, recording of tracking information of a target object and the like.

The processor 13 may be any image processing center or central control center that can execute/perform some instructions/tasks, and may be specifically an MCU. In addition to instructing the visible light camera 11 and/or the infrared camera 12 to perform corresponding tasks, the processor 13 is also configured to communicate with the remote control device 20, and perform a corresponding task based on instructions of the remote control device 20. Therefore, in this embodiment, the target tracking method provided by the embodiments of the present invention may be performed by the processor 13.

The memory 14 is communicatively connected to the processor 13. The memory may be a non-transitory computer-readable storage medium, and may be configured to store a non-transitory software program, a non-transitory computer-executable program and a module, such as program instructions/modules corresponding to the target tracking method in the embodiments of the present invention. The processor 13 runs the non-transitory software program, the instructions and the module stored in the memory 14, to implement the target tracking method in any of the following method embodiments. Specifically, the memory 14 may include a high-speed random access memory, and may further include a non-transitory memory, such as at least one magnetic disk memory device, a flash memory device, or other non-transitory solid-state memory devices. In some embodiments, the memory 14 may further include memories remotely disposed relative to the processor 13, and these remote memories may be connected to the processor 13 through a network. Examples of the network include, but are not limited to, the Internet, an intranet, a local area network, a mobile communication network and a combination thereof.

The remote control device 20 may be any device that can control the UAV 10, for example, a remote controller, a smart phone, a tablet computer or the like. The remote control device 20 may control, by transmitting a control instruction to the UAV 10, the UAV 10 to adjust a flight posture or perform a corresponding task, or may receive a signal or image data from the UAV 10. A display screen may be further disposed on the remote control device 20, and is configured to display an image according to the image data.

The target object 30 may any given tracked target. For example, the target object may be a bicycle, an automobile, a person, an animal, another flying object or the like.

During actual application, when the UAV 10 needs to be used to track the target object 30, a user/player may transmit a target tracking instruction to the processor 13 of the UAV 10 by using the remote control device 20. After receiving the target tracking instruction, the processor 13 may adopt the target tracking method provided in the embodiments of the present invention, to control the visible light camera 11 and the infrared camera 12 to track the target object 30. The method is specifically: controlling the visible light camera 11 to perform visual tracking on the target object 30, and recording first tracking information of the target object 30 in real time, where the first tracking information includes first location information of the target object; and controlling the infrared camera 12 to perform infrared tracking on the target object 30, and recording second tracking information of the target object 30 in real time, where the second tracking information includes second location information of the target object. During tracking, in a case of determining that the target object 30 is lost in the visible light camera 11, the processor 13 may control the visible light camera 11 to re-lock the target object 30 according to the second tracking information and continue to perform visual tracking. Alternatively, in a case of determining that the target object is lost in the infrared camera 12, the processor 13 may control the infrared camera 12 to re-lock the target object 30 according to the first tracking information and continue to perform infrared tracking. Therefore, by cooperating the visible light camera 11 with the infrared camera 12, continual tracking of the target object 30 may be implemented, thereby improving the target tracking performance of the UAV 10 and expanding the scope of application.

It should be noted that the foregoing application environment is merely used for exemplary description. During actual application, the target tracking method and the related apparatus provided in the embodiments of the present invention may be further applied to other suitable application environments, but are not limited to be applied to the application environment shown in FIG. 1. For example, in some other embodiments, the visible light camera 11 and the infrared camera 12 may also respectively correspond to different image processing centers. The two different image processing centers can independently perform corresponding tracking tasks, and information is exchanged between the two centers. When the target object 30 is lost in one of the two cameras, an image processing center corresponding to the camera obtains tracking information of the target object from an image processing center corresponding to the other camera, and further re-locks the target object 30 based on the obtained tracking information and continues to perform tracking.

Embodiment 2

Figure 2:
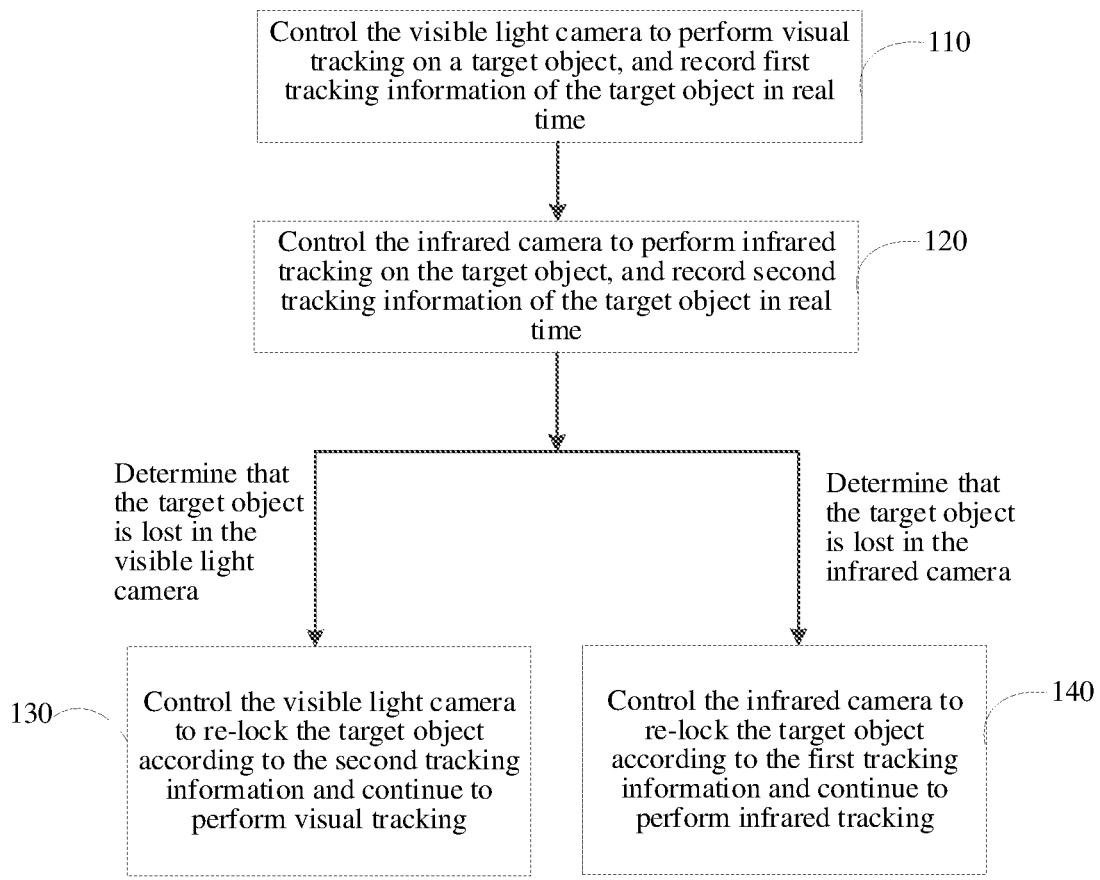
FIG. 2 is a schematic flowchart of a target tracking method according to an embodiment of the present invention.

FIG. 2 is a schematic flowchart of a target tracking method according to an embodiment of the present invention. The method may be performed by the foregoing UAV 10.

Specifically, referring to FIG. 2, the method may include, but is not limited to, the following steps:

Step 110. Control the visible light camera to perform visual tracking on a target object, and record first tracking information of the target object in real time.

In this embodiment, the "target object", that is, a target that needs to be tracked, may be independently recognized by the UAV based on some given features (such as a dynamic feature, an appearance feature and the like), or may be selected by a user by using a remote control device and then fed back to the UAV. The "visual tracking" refers to tracking the target object based on a visible light image sequence. The "first tracking information" refers to information that is obtained and recorded by the visible light camera during visual tracking of the target object, and is configured for facilitating the infrared camera of the UAV to lock the target object. Specifically, the "first tracking information" may include first location information (such as a location in the visible light image, an angle relative to the UAV, a distance from the UAV and the like) of the target object. By using the first location information, it is convenient for the UAV to quickly position a current location of the target object, and adjust a photographing angle of the infrared camera in a timely manner, thereby improving the efficiency of the infrared camera for locking the target object. In addition, in some other embodiments, to further ensure the locking accuracy of the target object, the first tracking information may further include information identifying features of the target object, for example, a shape, a size and the like.

During specific implementation, different manners in which the visible light camera is controlled to perform visual tracking on the target object may be adopted according to different manners in which the UAV determines the target object.

For example, in some embodiments, the target object is independently recognized by the UAV, which indicates that the visible light camera has locked the target object. Therefore, the visible light camera may perform visual tracking directly based on an image feature of the locked target object.

In another example, in some other embodiments, the target object may be designated by a user by using a remote control device. In this case, the visible light camera may be controlled, by using the method shown in FIG. 3, to perform visual tracking on the target object.

Figure 3:
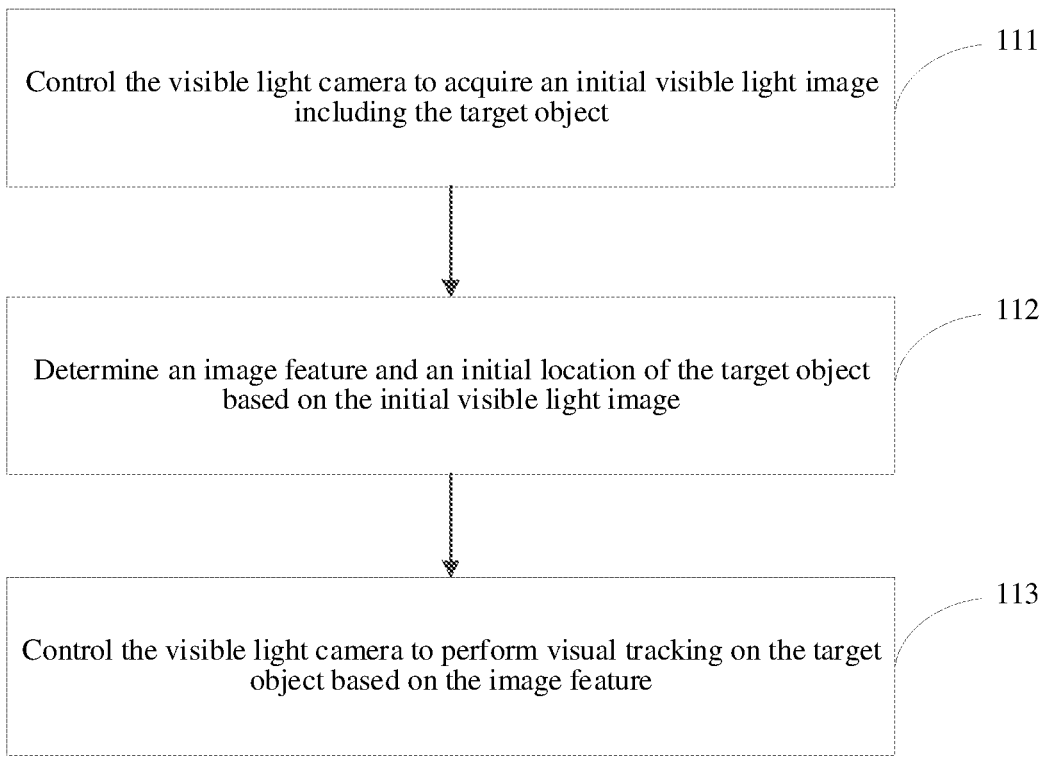
FIG. 3 is a schematic flowchart of a method for controlling a visible light camera to perform visual tracking on a target object according to an embodiment of the present invention.

Specifically, referring to FIG. 3, the method may include, but is not limited to, the following steps:

Step 111. Control the visible light camera to acquire an initial visible light image including the target object.

In this embodiment, the "initial visible light image" refers to an image acquired by the visible light camera when the user selects the target object. The initial visible light image includes the target object that is to be selected.

During actual application, the image acquired by the visible light camera may be fed back to the remote control device for display, so that the user selects the target object in the displayed image. Therefore, the user may adjust a photographing angle of the visible light camera based on the displayed image. When the user stops adjusting the photographing angle of the visible light camera, it indicates that the user finds the target object from the currently displayed image. In this case, the visible light image acquired by the visible light camera at the current photographing angle is the "initial visible light image".

Step 112. Determine an image feature and an initial location of the target object based on the initial visible light image.

When the user identifies the target object on the remote control device, the target object may be locked by using a location that is identified by the user in the initial visible light image, and an image feature and an initial location of the target object are determined. The initial location is configured for facilitating the infrared camera to lock the target object, and may be specifically one or more of a location of the target object in the visible light image, an angle of the target object relative to the UAV and a distance between the target object and the UAV.

Step 113. Control the visible light camera to perform visual tracking on the target object based on the image feature.

Generally, visual tracking is mostly performed according to the image feature of the target object. Therefore, in this embodiment, after the image feature of the target object is obtained, the visible light camera may be controlled to perform visual tracking on the target object based on the image feature.

In addition, in the process of visual tracking, the first tracking information of the target object is also recorded in real time, so that when the target object is lost in the infrared camera, the infrared camera re-locks the target object according to the first tracking information.

Step 120. Control the infrared camera to perform infrared tracking on the target object, and record second tracking information of the target object in real time.

The "infrared tracking" refers to tracking the target object based on an infrared image sequence. The "infrared tracking" and the "visual tracking" are performed synchronously. The "second tracking information" refers to information that is obtained and recorded by the infrared camera during infrared tracking of the target object, and is configured for facilitating the visible light camera to lock the target object.

Similar to the "first tracking information", the "second tracking information" may also include second location information (such as a location in the infrared image, an angle relative to the UAV, a distance from the UAV and the like) of the target object. In addition, to further ensure the locking accuracy of the target object, the second tracking information may further include information identifying features of the target object, for example, a shape, a size and the like.

During specific implementation, different manners in which the infrared camera is controlled to perform infrared tracking on the target object may be adopted according to different manners in which the UAV determines the target object. For example, in some embodiments, the target object may be independently recognized by the infrared camera based on some given features (such as a heat signature, a contour feature and the like). Therefore, the infrared camera may perform infrared tracking directly based on these given features.

Alternatively, in some other embodiments, the target object may be designated by the user by using the remote control device. In this case, the infrared camera may be controlled, by using the method shown in FIG. 4 based on step 111 to step 113, to perform infrared tracking on the target object.

Figure 4:
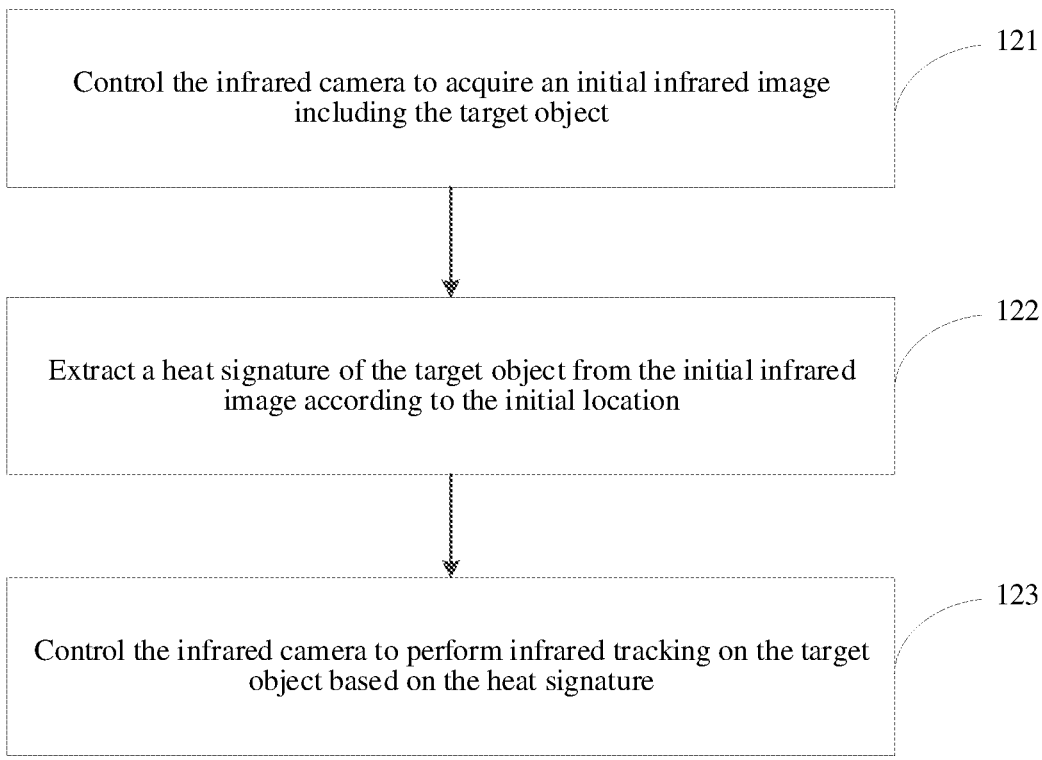
FIG. 4 is a schematic flowchart of a method for controlling an infrared camera to perform infrared tracking on a target object according to an embodiment of the present invention.

Specifically, referring to FIG. 4, the method may include, but is not limited to, the following steps:

Step 121. Control the infrared camera to acquire an initial infrared image including the target object.

In this embodiment, the "initial infrared image" refers to an image acquired by the infrared camera when the user selects the target object. The initial infrared image corresponds to the same photographing scene as the "initial visible light image", and also includes the target object that is to be selected.

During actual application, a photographing direction of the infrared camera may be adjusted in advance to be consistent with a photographing direction of the visible light camera, so that photographing objects/photographing scenes of the infrared camera and the visible light camera are consistent. Therefore, when the "initial visible light image" is acquired by the visible light camera, the "initial infrared image" is also acquired by the infrared camera.

Step 122. Extract a heat signature of the target object from the initial infrared image according to the initial location.

Because the initial infrared image and the initial visible light image are two different presentation manners specific to the same photographing scene, in this embodiment, the target object may be first positioned in the initial infrared image according to the initial location of the target object, and then a heat signature of the target object is extracted from the initial infrared image.

Step 123. Control the infrared camera to perform infrared tracking on the target object based on the heat signature.

Generally, infrared tracking is mostly performed according to the heat signature of the target object. Therefore, in this embodiment, after the heat signature of the target object is obtained, the infrared camera may be controlled to perform infrared tracking on the target object based on the heat signature.

Similarly, in the process of infrared tracking, the second tracking information of the target object is also recorded in real time, so that when the target object is lost in the visible light camera, the visible light camera re-locks the target object according to the second tracking information.

It should be understood that in the foregoing embodiment, the image acquired by the visible light camera is fed back to the remote control device for display, so that the user selects the target object in the initial visible light image, to obtain the initial location of the target object, thereby locking the target object in the initial infrared image based on the initial location. It is mainly because that generally, a visual effect of the visible light image is similar to that seen by naked eyes, and the image has a relatively high definition, so that the user may clearly recognize the target object that the user desires to track in the visible light image. However, the infrared image is a picture formed by acquiring heat, so that the user cannot see various things clearly, but only can see a contour formed by heat. In some other embodiments, the image acquired by the infrared camera may be simultaneously fed back to the remote control device for auxiliary display, so that the user simultaneously selects the target object in the initial infrared image.

Moreover, during tracking, in a case of determining that the target object is lost in the visible light camera, for example, when the target object is shielded or the target object is located outside a field of view of the visible light camera, the following step 130 is performed. In a case of determining that the target object is lost in the infrared camera, for example, when the infrared camera cannot explore the heat signature of the target object, the following step 140 is performed.

Step 130. Control the visible light camera to re-lock the target object according to the second tracking information and continue to perform visual tracking.

In this embodiment, in a case of determining that the target object is lost in the visible light camera, the second tracking information recorded by the infrared camera at the current moment may be fed back to the visible light camera, so that the visible light camera re-locks the target object according to the second tracking information and continues to perform visual tracking.

In some embodiments, the second tracking information includes second location information of the target object. Therefore, a specific implementation of re-locking, by the visible light camera, the target object according to the second tracking information may be: determining, according to the current second location information of the target object, whether the target object is located in a field of view range of the visible light camera. If the target object is located in the field of view range of the visible light camera, it indicates that the target object may be shielded. In this case, the infrared camera may be used as a main device to perform infrared tracking on the target object, and the visible light camera continues to use a current location of the target object as a photographing center based on the second location information fed back by the infrared camera, and re-locks the target object after the target object is not shielded. If the target object is not located in the field of view range of the visible light camera, it indicates that the target object is located in a blind region of the visible light camera. In this case, a photographing angle of the visible light camera may be adjusted according to the second location information of the target object, to enable the target object to fall within the field of view range of the visible light camera, thereby re-locking the target object by using the image feature and the second location information of the target object.

Step 140. Control the infrared camera to re-lock the target object according to the first tracking information and continue to perform infrared tracking.

In this embodiment, in a case of determining that the target object is lost in the infrared camera, the first tracking information recorded by the visible light camera at the current moment may be fed back to the infrared camera, so that the infrared camera re-locks the target object according to the first tracking information and continues to perform infrared tracking.

In some embodiments, the first tracking information includes first location information of the target object. Therefore, the infrared camera may quickly position a current location of the target object according to the first location information, and extract a heat signature at this location. If the extracted heat signature matches with the heat signature of the target object, the target object is re-locked and infrared tracking continues to be performed. If the extracted heat signature does not match with the heat signature of the target object, manual operation is requested from the remote control device.

It can be known from the foregoing technical solution that this embodiment of the present invention has the following beneficial effects: according to the target tracking method provided in this embodiment of the present invention, a visible light camera and an infrared camera on a UAV are controlled to respectively perform visual tracking and infrared tracking on a target object, and record first tracking information and second tracking information of the target object in real time. In addition, when the target object is lost in the visible light camera, the visible light camera is controlled to re-lock the target object according to the second tracking information recorded by the infrared camera and continue to perform visual tracking. Alternatively, when the target object is lost in the infrared camera, the infrared camera is controlled to re-lock the target object according to the first tracking information recorded by the visible light camera and continue to perform infrared tracking, which can improve the target tracking performance of the UAV and expand the scope of application by cooperating the two types of cameras.

Embodiment 3

Further, given that during target tracking, the visible light camera and the infrared camera may not be able to correctly lock the target object due to the interference of environmental factors, another target tracking method is provided in an embodiment of the present invention.

A difference between the method and the target tracking method provided in Embodiment 2 lies in that the method further includes: determining, when the first location information is inconsistent with the second location information, whether the visible light camera and the infrared camera are interfered. If the visible light camera is not interfered, the infrared camera is controlled to re-lock the target object according to the first location information and continue to perform infrared tracking. If the visible light camera is interfered, but the infrared camera is not interfered, the visible light camera is controlled to re-lock the target object according to the second location information and continue to perform visual tracking. If both the visible light camera and the infrared camera are interfered, a manual control request is transmitted to a remote control device of the UAV, to exit an automatic tracking mode.

It can be known from the foregoing technical solution that this embodiment of the present invention has the following beneficial effects: according to the target tracking method provided in this embodiment of the present invention, when the first location information is inconsistent with the second location information, the visible light camera and the infrared camera are controlled to perform corresponding adjustment, which can further improve the reliability of target tracking.

Embodiment 4

To facilitate a user to view a tracking picture of the target object in real time and facilitate the user to adjust, in a timely manner, a target that needs to be tracked, still another target tracking method is provided in Embodiment 4 of the present invention.

A difference between the method and the methods provided in Embodiment 2 and Embodiment 3 lies in that in this embodiment, the method further includes: transmitting a visible light image acquired by the visible light camera to the remote control device of the UAV, so that the remote control device displays the visible light image in real time. It is convenience for the user to clearly know a moving status of the target object.

Further, in some embodiments, when the target object is lost in the visible light camera, an infrared image acquired by the infrared camera may be further transmitted to the remote control device, so that the remote control device displays the infrared image or simultaneously displays the visible light image and the infrared image. Therefore, even if the target object is lost in the visible light camera, the moving status of the target object may also be presented to the user by using the infrared image acquired by the infrared camera.

Moreover, in some other embodiments, when the user finds that the target tracked by the visible light camera is wrong, or the user desires to change the target object, a target adjustment instruction may further be transmitted to the UAV by using the remote control device. The target adjustment instruction may carry location information or an image feature of a new target. Correspondingly, in this embodiment, the target tracking method may further include: receiving a target adjustment instruction transmitted by the remote control device; controlling the visible light camera to re-lock a new target object according to the target adjustment instruction and perform visual tracking, and recording third tracking information of the re-locked new target object in real time; and controlling the infrared camera to perform infrared tracking on the re-locked new target object according to the third tracking information, and recording fourth tracking information of the re-locked new target object in real time. The third tracking information and the fourth tracking information are respectively similar to the first tracking information and the second tracking information. A difference lies in that: the first tracking information and the second tracking information are tracking information for the initially locked target object, but the third tracking information and the fourth tracking information are tracking information for the new target object that is re-locked according to the target adjustment instruction transmitted by the user.

It can be known from the foregoing technical solution that this embodiment of the present invention has the following beneficial effects: according to the target tracking method provided in this embodiment of the present invention, a visible light image acquired by the visible light camera is transmitted to the remote control device of the UAV, so that the remote control device displays the visible light image in real time, which can facilitate the user to view the tracking picture of the target object in real time, and facilitate the user to adjust, in a timely manner, the target that needs to be tracked.

Embodiment 5

Figure 5:
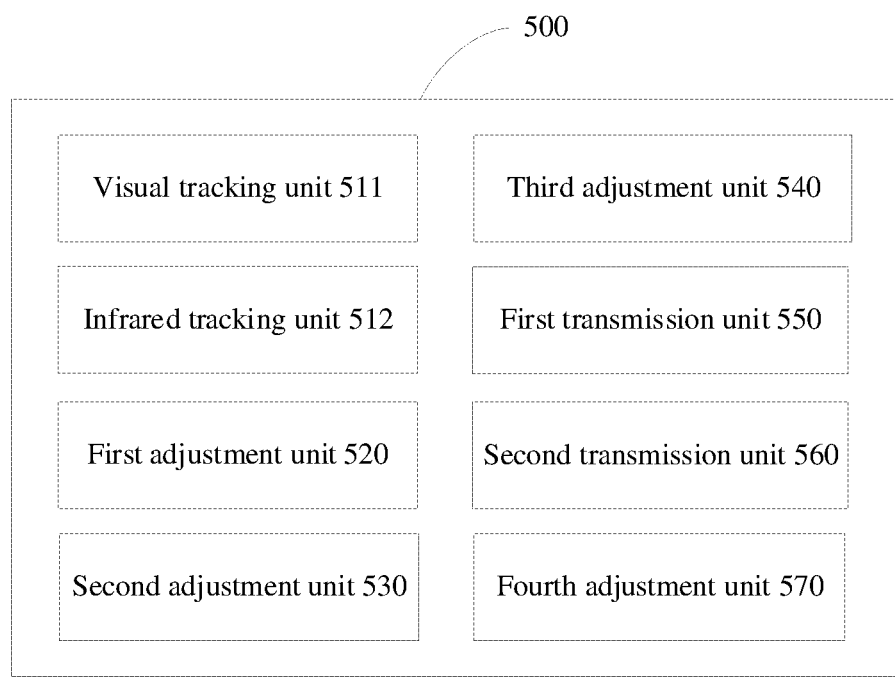
FIG. 5 is a schematic structural diagram of a target tracking apparatus according to an embodiment of the present invention.

FIG. 5 is a schematic structural diagram of a target tracking apparatus according to an embodiment of the present invention. The target tracking apparatus may run on the UAV 10 shown in FIG. 1. The UAV includes a visible light camera and an infrared camera.

Specifically, referring to FIG. 5, the apparatus 500 includes: a visual tracking unit 511, an infrared tracking unit 512, a first adjustment unit 520 and a second adjustment unit 530.

The visual tracking unit 511 is configured to control the visible light camera to perform visual tracking on a target object, and record first tracking information of the target object in real time, where the first tracking information includes first location information of the target object.

The infrared tracking unit 512 is configured to control the infrared camera to perform infrared tracking on the target object, and record second tracking information of the target object in real time, where the second tracking information includes second location information of the target object.

The first adjustment unit 520 is configured to control, in a case of determining that the target object is lost in the visible light camera, the visible light camera to re-lock the target object according to the second tracking information and continue to perform visual tracking.

The second adjustment unit 530 is configured to control, in a case of determining that the target object is lost in the infrared camera, the infrared camera to re-lock the target object according to the first tracking information and continue to perform infrared tracking.

In this embodiment, the visual tracking unit 511 may first control the visible light camera to perform visual tracking on a target object, and record first tracking information of the target object in real time, and the infrared tracking unit 512 may control the infrared camera to perform infrared tracking on the target object, and record second tracking information of the target object in real time. During tracking, in a case of determining that the target object is lost in the visible light camera, the first adjustment unit 520 controls the visible light camera to re-lock the target object according to the second tracking information and continue to perform visual tracking; and in a case of determining that the target object is lost in the infrared camera, the second adjustment unit 530 controls the infrared camera to re-lock the target object according to the first tracking information and continue to perform infrared tracking.

Specifically, in some embodiments, the visual tracking unit 511 is further configured to: control the visible light camera to acquire an initial visible light image including the target object; determine an image feature and an initial location of the target object based on the initial visible light image; and control the visible light camera to perform visual tracking on the target object based on the image feature, and record the first tracking information of the target object in real time. The infrared tracking unit 512 is further configured to: control the infrared camera to acquire an initial infrared image of the target object; extract a heat signature of the target object from the initial infrared image according to the initial location of the target object; and control the infrared camera to perform infrared tracking on the target object based on the heat signature, and record the second tracking information of the target object in real time.

Further, in some embodiments, the apparatus 500 further includes a third adjustment unit 540.

The third adjustment unit 540 is configured to: determine, when the first location information is inconsistent with the second location information, whether the visible light camera and the infrared camera are interfered; control, if the visible light camera is not interfered, the infrared camera to re-lock the target object according to the first location information and continue to perform infrared tracking; control, if the visible light camera is interfered, but the infrared camera is not interfered, the visible light camera to re-lock the target object according to the second location information and continue to perform visual tracking; and transmit a manual control request to a remote control device of the UAV if both the visible light camera and the infrared camera are interfered, to exit an automatic tracking mode.

In some embodiments, the apparatus 500 further includes: a first transmission unit 550, configured to transmit a visible light image acquired by the visible light camera to the remote control device of the UAV, so that the remote control device displays the visible light image in real time.

In some embodiments, the apparatus 500 further includes: a second transmission unit 560, configured to transmit, when the target object is lost in the visible light camera, an infrared image acquired by the infrared camera to the remote control device, so that the remote control device displays the infrared image or simultaneously displays the visible light image and the infrared image.

In some embodiments, the apparatus 500 further includes a fourth adjustment unit 570. The fourth adjustment unit 570 is configured to: receive a target adjustment instruction transmitted by the remote control device; control the visible light camera to re-lock a new target object according to the target adjustment instruction and perform visual tracking, and record third tracking information of the re-locked new target object in real time; and control the infrared camera to perform infrared tracking on the re-locked new target object according to the third tracking information, and record fourth tracking information of the re-locked new target object in real time, where the third tracking information and the fourth tracking information are tracking information for the new target object that is re-locked according to the target adjustment instruction.

It should be noted that because the target tracking apparatus and the target tracking method described in the foregoing method embodiments are based on the same inventive concept, the corresponding content in the foregoing method embodiments are also applicable to this apparatus embodiment, and details are not described herein again.

It can be known from the foregoing technical solution that this embodiment of the present invention has the following beneficial effects: according to the target tracking apparatus provided in this embodiment of the present invention, a visible light camera and an infrared camera on a UAV are controlled, respectively by using the visual tracking unit 511 and the infrared tracking unit 512, to respectively perform visual tracking and infrared tracking on a target object, and record first tracking information and second tracking information of the target object in real time. In addition, in a case of determining that the target object is lost in the visible light camera, the visible light camera is controlled, by the first adjustment unit 520, to re-lock the target object according to the second tracking information recorded by the infrared camera and continue to perform visual tracking. Alternatively, in a case of determining that the target object is lost in the infrared camera, the infrared camera is controlled, by the second adjustment unit 530, to re-lock the target object according to the first tracking information recorded by the visible light camera and continue to perform infrared tracking, which can improve the target tracking performance of the UAV and expand the scope of application by cooperating the two types of cameras.

It should be understood that the foregoing described apparatus embodiment is merely exemplary. The units described as separate parts may or may not be physically separate, and the parts displayed as units may or may not be physical units, may be located in one position, or may be distributed on a plurality of network units. Some or all of the modules may be selected according to actual requirements to implement the objectives of the solutions of the embodiments.

Embodiment 6

An embodiment of the present invention further provides a non-transitory computer-readable storage medium. The non-transitory computer-readable storage medium stores computer-executable instructions, the computer-executable instructions being executed by one or more processors, for example, one processor 13 shown in FIG. 1, so that the one or more processors perform the target tracking method in any of the foregoing method embodiments, for example, perform the foregoing described method steps 110, 120 and 130 or 140 in FIG. 2, the method steps 111 to 113 in FIG. 3 and the method steps 121 to 123 in FIG. 4.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a UAV, the UAV may be enabled to execute the procedures of the foregoing method embodiments. The storage medium may be a magnetic disk, an optical disc, a read-only memory (ROM), a random access memory (RAM) or the like.

For the foregoing product, the target tracking method provided in the embodiments of the present invention may be performed, and the corresponding functional modules for performing the target tracking method and beneficial effects thereof are provided. For technical details not described in detail in this embodiment, reference may be made to the target tracking method provided in the embodiments of the present invention.

Finally, it should be noted that the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above. These changes are not provided in detail for simplicity. It should be understood by a person of ordinary skill in the art that although the present invention has been described in detail with reference to the foregoing embodiments, modifications can be made to the technical solutions described in the foregoing embodiments, or equivalent replacements can be made to some technical features in the technical solutions; and these modifications or replacements will not cause the essence of corresponding technical solutions to depart from the scope of the technical solutions in the embodiments of the present invention.

What is claimed is:

1. A target tracking method, applicable to an unmanned aerial vehicle (UAV), the UAV comprising a visible light camera and an infrared camera, wherein the method comprises:
controlling the visible light camera to perform visual tracking on a target object, and recording first tracking information of the target object in real time, wherein the first tracking information comprises first location information of the target object;
controlling the infrared camera to perform infrared tracking on the target object, and recording second tracking information of the target object in real time, wherein the second tracking information comprises second location information of the target object;

in a case of determining that the target object is lost in the visible light camera,
controlling the visible light camera to re-lock the target object according to the second tracking information and continue to perform visual tracking; or
in a case of determining that the target object is lost in the infrared camera,
controlling the infrared camera to re-lock the target object according to the first tracking information and continue to perform infrared tracking;
the infrared tracking and visual tracking are performed independently,
determining, when the first location information is inconsistent with the second location information, whether there is interference with the visible light camera and the infrared camera;
controlling, when the visible light camera is not interfered, the infrared camera to re-lock the target object according to the first location information and continue to perform infrared tracking;
controlling, when the visible light camera is interfered, but the infrared camera is not interfered, the visible light camera to re-lock the target object according to the second location information and continue to perform visual tracking; and
transmitting a manual control request to a remote control device of the UAV when both the visible light camera and the infrared camera are interfered, to exit an automatic tracking mode.

2. The method according to claim 1, wherein the controlling the visible light camera to perform visual tracking on a target object, and recording first tracking information of the target object in real time comprises:
controlling the visible light camera to acquire an initial visible light image of the target object;
determining an image feature and an initial location of the target object based on the initial visible light image; and
controlling the visible light camera to perform visual tracking on the target object based on the image feature, and recording the first tracking information of the target object in real time.

3. The method according to claim 2, wherein the controlling the infrared camera to perform infrared tracking on the target object, and recording second tracking information of the target object in real time comprises:
controlling the infrared camera to acquire an initial infrared image of the target object;
extracting a heat signature of the target object from the initial infrared image according to the initial location of the target object; and
controlling the infrared camera to perform infrared tracking on the target object based on the heat signature, and recording the second tracking information of the target object in real time.

4. The method according to claim 1, further comprising:
transmitting a visible light image acquired by the visible light camera to the remote control device of the UAV, so that the remote control device displays the visible light image in real time.

5. The method according to claim 4, wherein when the target object is lost in the visible light camera, the method further comprises:
transmitting an infrared image acquired by the infrared camera to the remote control device, so that the remote control device displays the infrared image or simultaneously displays the visible light image and the infrared image.

6. The method according to claim 4, further comprising:
receiving a target adjustment instruction transmitted by the remote control device;
controlling the visible light camera to re-lock a new target object according to the target adjustment instruction and perform visual tracking, and recording third tracking information of the re-locked new target object in real time; and
controlling the infrared camera to perform infrared tracking on the re-locked new target object according to the third tracking information, and recording fourth tracking information of the re-locked new target object in real time, wherein
the third tracking information and the fourth tracking information are tracking information for the new target object that is re-locked according to the target adjustment instruction.

7. A target tracking apparatus, applicable to an unmanned aerial vehicle (UAV), the UAV comprising a visible light camera and an infrared camera, wherein the apparatus comprises:
a memory, configured to store a computer-executable target tracking program; and
a processor, configured to invoke the computer-executable target tracking program to implement:
controlling the visible light camera to perform visual tracking on a target object, and recording first tracking information of the target object in real time, wherein the first tracking information comprises first location information of the target object;
controlling the infrared camera to perform infrared tracking on the target object, and recording second tracking information of the target object in real time, wherein the second tracking information comprises second location information of the target object;
controlling, in a case of determining that the target object is lost in the visible light camera, the visible light camera to re-lock the target object according to the second tracking information and continue to perform visual tracking; and
controlling, in a case of determining that the target object is lost in the infrared camera, the infrared camera to re-lock the target object according to the first tracking information and continue to perform infrared tracking,
the infrared tracking and visual tracking are performed independently,
wherein the processor is further configured to:
determine, when the first location information is inconsistent with the second location information, whether there is interference with the visible light camera and the infrared camera;
control, when the visible light camera is not interfered, the infrared camera to re-lock the target object according to the first location information and continue to perform infrared tracking;
control, when the visible light camera is interfered, but the infrared camera is not interfered, the visible light camera to re-lock the target object according to the second location information and continue to perform visual tracking; and
transmit a manual control request to a remote control device of the UAV when both the visible light camera and the infrared camera are interfered, to exit an automatic tracking mode.

8. The apparatus according to claim 7, wherein the processor is further configured to:
control the visible light camera to acquire an initial visible light image comprising the target object;
determine an image feature and an initial location of the target object based on the initial visible light image; and
control the visible light camera to perform visual tracking on the target object based on the image feature, and record the first tracking information of the target object in real time.

9. The apparatus according to claim 8, wherein the processor is further configured to:
control the infrared camera to acquire an initial infrared image of the target object;
extract a heat signature of the target object from the initial infrared image according to the initial location of the target object; and
control the infrared camera to perform infrared tracking on the target object based on the heat signature, and record the second tracking information of the target object in real time.

10. The apparatus according to claim 7, wherein
the processor is configured to transmit a visible light image acquired by the visible light camera to the remote control device of the UAV, so that the remote control device displays the visible light image in real time.

11. The apparatus according to claim 10, wherein
the processor is further configured to transmit, when the target object is lost in the visible light camera, an infrared image acquired by the infrared camera to the remote control device, so that the remote control device displays the infrared image or simultaneously displays the visible light image and the infrared image.

12. The apparatus according to claim 10, wherein the processor is further configured to:
receive a target adjustment instruction transmitted by the remote control device;
control the visible light camera to re-lock a new target object according to the target adjustment instruction and perform visual tracking, and record third tracking information of the re-locked new target object in real time; and
control the infrared camera to perform infrared tracking on the re-locked new target object according to the third tracking information, and record fourth tracking information of the re-locked new target object in real time, wherein
the third tracking information and the fourth tracking information are tracking information for the new target object that is re-locked according to the target adjustment instruction.

13. An unmanned aerial vehicle (UAV), comprising:
a body;
arms connected to the body;
a visible light camera, disposed on the body;
an infrared camera, disposed on the body;
at least one processor, disposed on the body, wherein the processor is communicatively connected to the visible light camera and the infrared camera respectively; and
a memory, communicatively connected to the processor, wherein
the memory stores instructions executable by the at least one processor, the instructions being executed by the at least one processor, to cause the at least one processor to perform:

controlling the visible light camera to perform visual tracking on a target object, and recording first tracking information of the target object in real time, wherein the first tracking information comprises first location information of the target object;
controlling the infrared camera to perform infrared tracking on the target object, and recording second tracking information of the target object in real time, wherein the second tracking information comprises second location information of the target object;
in a case of determining that the target object is lost in the visible light camera,
controlling the visible light camera to re-lock the target object according to the second tracking information and continue to perform visual tracking; or
in a case of determining that the target object is lost in the infrared camera,
controlling the infrared camera to re-lock the target object according to the first tracking information and continue to perform infrared tracking
the infrared tracking and visual tracking are performed independently;
wherein the processor is further configured to;
determine, when the first location information is inconsistent with the second location information, whether there is interference with the visible light camera and the infrared camera;
control, if the visible light camera is not interfered, the infrared camera to re-lock the target object according to the first location information and continue to perform infrared tracking;
control, if the visible light camera is interfered, but the infrared camera is not interfered, the visible light camera to re-lock the target object according to the second location information and continue to perform visual tracking; and
transmit a manual control request to a remote control device of the UAV if both the visible light camera and the infrared camera are interfered, to exit an automatic tracking mode.

14. A non-transitory computer-readable storage medium, the non-transitory computer-readable storage medium storing computer-executable instructions, the computer-executable instructions being configured to enable an unmanned aerial vehicle (UAV) to perform:
controlling the visible light camera to perform visual tracking on a target object, and recording first tracking information of the target object in real time, wherein the first tracking information comprises first location information of the target object;
controlling the infrared camera to perform infrared tracking on the target object, and recording second tracking information of the target object in real time, wherein the second tracking information comprises second location information of the target object;
in a case of determining that the target object is lost in the visible light camera,
controlling the visible light camera to re-lock the target object according to the second tracking information and continue to perform visual tracking; or
in a case of determining that the target object is lost in the infrared camera,
controlling the infrared camera to re-lock the target object according to the first tracking information and continue to perform infrared tracking;
the infrared tracking and visual tracking are performed independently;

wherein the processor is further configured to;
determine, when the first location information is inconsistent with the second location information, whether there is interference with the visible light camera and the infrared camera;
control, when the visible light camera is not interfered, the infrared camera to re-lock the target object according to the first location information and continue to perform infrared tracking;
control, when the visible light camera is interfered, but the infrared camera is not interfered, the visible light camera to re-lock the target object according to the second location information and continue to perform visual tracking; and
transmit a manual control request to a remote control device of the UAV when both the visible light camera and the infrared camera are interfered, to exit an automatic tracking mode.

\* \* \* \* \*